United States Patent [19]

Kruckemeyer et al.

[11] Patent Number: 4,644,200

[45] Date of Patent: Feb. 17, 1987

[54] ROTATIONAL ACTUATOR FOR VEHICLE SUSPENSION DAMPER

[75] Inventors: William C. Kruckemeyer, Xenia; Harry C. Buchanan, Jr., Spring Valley; Wayne V. Fannin, Xenia, all of Ohio

[73] Assignee: General Motors Corporation, Detroit, Mich.

[21] Appl. No.: 764,349

[22] Filed: Aug. 12, 1985

[51] Int. Cl.$^{4}$ .............................................. H02K 1/04

[52] U.S. Cl. ...................................... 310/43; 310/154; 310/90

[58] Field of Search .................... 310/43, 154, 90, 261

[56] References Cited

U.S. PATENT DOCUMENTS

| | | | |
|---|---|---|---|
| Re. 29,445 | 10/1977 | Nusser et al. . | |
| 3,191,079 | 6/1965 | Gitzendanner | 310/261 X |
| 3,891,876 | 6/1975 | Herr et al. | 310/43 |
| 3,909,645 | 9/1975 | Herr et al. | 310/43 X |
| 4,139,789 | 2/1979 | Hunt . | |
| 4,303,901 | 12/1981 | Grimm et al. . | |
| 4,345,228 | 8/1982 | Idogaki . | |
| 4,393,362 | 9/1983 | Skrobisch . | |

*Primary Examiner*—Donovan F. Duggan

*Attorney, Agent, or Firm*—Robert M. Sigler

[57] ABSTRACT

A rotational actuator for the interior of an adjustable vehicle suspension damper device comprises a cylindrical permanent magnet stator and a cylindrical armature. The armature includes a shaftless winding on a non-magnetic armature frame, the armature frame extending axially beyond the winding at each end with output engaging means at one end and an opening between that end and the winding projecting radially inward across the axis of the armature. A first shaft coaxial with the armature is anchored in the one axial end of the armature frame and rotatably supported in a first axial support. A second axial support in the stator projects into the opening of the armature frame across the armature axis and supports a second shaft coaxial with the armature and extending across the opening of the second axial end of the armature frame, whereby the armature is supported at each axial end close to the winding and core while the radial size of the actuator is minimized. Rotational limit stops may be formed on the bridge portion of the armature adjacent the radially inwardly projecting opening and on the second support means. An additional intermediate stop may comprise flat surfaces on the armature and a stationary U-shaped spring; or output ratchet apparatus may be provided.

4 Claims, 9 Drawing Figures

ROTATIONAL ACTUATOR FOR VEHICLE SUSPENSION DAMPER

SUMMARY OF THE INVENTION

This invention relates to a rotational actuator for the interior of an adjustable vehicle suspension damper such as a strut or shock absorber. Such an actuator must be capable of rotating a valve element in the damper to adjust the damping force thereof. It should be completely contained within the body of the damper without significantly increasing the diameter or length thereof. It preferably is of simple and rugged construction and acts directly on the valve element without need of intermediate gearing. It is capable of actuation through a precise rotational angle or to a precise rotational position. It must be actuatable by electric signals from an external control system.

The known prior art includes external rotational actuators for vehicle suspension dampers and internal actuators having complex mechanical structure of the escapement type or stepper motors with torque multiplying gearing. However, of the internal actuators, the escapement mechanism is comparatively expensive to manufacture and the gears increase complexity. A simpler and less expensive structure is desirable.

SUMMARY OF THE INVENTION

The invention is embodied in its broadest form in a rotational actuator for the interior of an adjustable vehicle suspension damper device comprising a cylindrical permanent magnet stator, a cylindrical armature coaxial with the stator, the armature comprising a shaftless winding on a non-magnetic armature frame, the armature frame having a first axial end extending axially slightly beyond the core and winding at one axial end thereof and a second axial end extending beyond the armature frame at the other axial end thereof, the second axial end including output engaging means at the free end thereof and having an opening projecting radially inward across the axis of the armature, a first shaft coaxial with the armature and having one end anchored in the first axial end of the armature frame, first axial support means in the stator adjacent the first axial end of the armature frame and adapted to receive the other end of the first shaft for rotation therein, second axial support means in the stator adapted to project into the opening of the second axial end of the armature frame across the armature axis, a second shaft in the second axial end of the armature frame, the second shaft being coaxial with the armature, extending across the opening of the second axial end of the armature frame and being supported for rotation by the second axial support means, whereby the armature is supported at each axial end close to the winding and core while the radial size of the actuator is minimized.

In this structure, the armature frame is substatially a single piece for reduced size, cost and dimensional tolerance stackup, and the armature shaft is removed from the interior of the winding in order to minimize the diameter of the actuator. However, the shaft supports are maintained as closely as possible to the axial ends of the winding to minimize deformation of the armature frame due to the high forces encountered by the winding. One end of the armature frame extends beyond the shaft support to provide axial driving means for the valve element; and the radial opening of this end provides room for the shaft support and may also provide a rotational stop for the armature.

Further details and advantages of this invention will be apparent from the accompanying drawings and following description of a preferred embodiment.

DESCRIPTION OF THE PREFERRED EMBODIMENT

Figure 1:
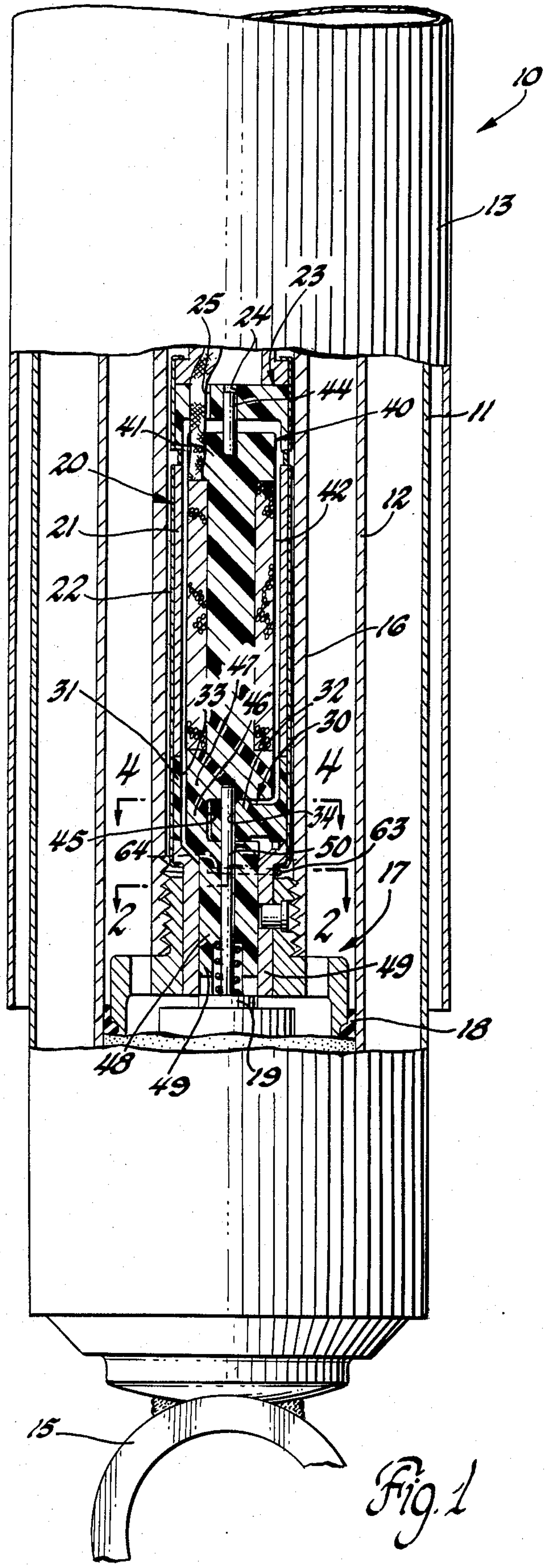
FIG. 1 shows a partial cutaway view of a vehicle suspension damper including an actuator according to this invention.

Referring to FIG. 1, an adjustable vehicle suspension damper is shown as a shock absorber 10 having an outer cylindrical reservoir tube 11, an inner cylindrical pressure tube 12 and a cylindrical dust cover 13. Tubes 11 and 12 are rigidly connected at the lower end of shock absorber 10 in the standard manner by a base valve, not shown, and at the upper end of shock absorber 10 in the standard manner by a bearing and seal assembly, also not shown. A fitting 15 is secured to the lower end of tube 11 for attachment of shock absorber 10 in a vehicle suspension system, not shown; and another fitting, not shown, is provided at the upper end of dust cover 13 for the same purpose.

Within pressure tube 12, a hollow piston tube 16 is connected at its upper end to dust cover 13 and the unshown upper fitting and carries on its lower end a piston assembly 17 having outer sealing means 18 for sealed, axially slidable movement within tube 12. Pressure tube 12 and reservoir tube 11 are attached through fitting 15 to the unsprung mass of the vehicle suspension. Dust cover 13, piston tube 16 and piston assembly 17, on the other hand, are attached to the sprung mass of the vehicle suspension, so that relative verticle movement between the sprung and unsprung masses causes piston assembly 17 to move axially within tube 12 and pump a non-compressible fluid through valves in piston assembly 17. The basic structure and pumping operation of shock absorbers as described above is well known to those skilled in the art.

Piston assembly 17 differs from a conventional shock absorber piston assembly, however, in that it includes valve elements which are rotatably adjustable to vary the restriction thereof to fluid passage and thus the damping characteristics of shock absorber 10. A number of such adjustable shock absorbers are shown in the prior art; but particular attention is directed to patent application U.S. Pat. No. 681,137 of Buchanan Jr. et al, filed Dec. 13, 1984. The actuator of this invention could be substituted for that in the aforementioned application. In this application, however, the rotatable valve elements are rotatably driven through a rotor 19 having a plurality of fingers, not shown, surrounding the axis of piston tube 16 and projecting axially thereinto. The invention described herein is an actuator which is contained within piston tube 16 and engages these fingers for rotation of rotor 19.

The actuator is indicated generally by the numeral 20. A stator comprises an annular permanent magnet 21 or arrangement of permanent magnets within an annular sleeve 22, annular sleeve 22 being made of a magnetic material such as steel to act as a flux ring and further being affixed within piston tube 16. At the upper end of actuator 20, an axial support 23 is held within piston tube 16 by annular sleeve 22. Axial support 23 is made of a polymeric plastic resin and includes an axial cylindrical opening 24 adapted to receive a rotating shaft, yet to be described, and another opening 25 for the passage of electric wires therethrough. At the lower end of actuator 20, an axial support 30, also made of a polymeric plastic resin, includes an outer annular rim 31 and a spoke 32 projecting from the rim radially inward to define a large open sector 33, as seen most easily in FIGS. 4 or 5. Axial support 30 is also held within piston tube 16 by annular sleeve 22 so that the entire stator assembly can be axially inserted into and withdrawn from piston tube 16. Spoke 32 of axial support 30 includes an axial cylindrical opening 34 adapted to receive a rotating shaft, not yet described.

Actuator 20 further includes an armature 40 comprising an armature frame 41 made of a non-magnetic polymeric plastic resin and having wound thereon an armature winding 42. Armature winding 42 has a pair of end wires which extend loosely through opening 25 in axial support 23 to connect with connector terminals, not shown, for external communication with a control and electric power system. There is no need for slip rings in this embodiment since the armature is only rotated back and forth through an angle of about 120 degrees. Frame 41 projects axially slightly beyond winding 42 adjacent axial support 23 and includes an axial shaft 44 fixed in the axial end of frame 41 and projecting axially into opening 24 of axial support 23 for rotation therein. Shaft 44 is made of hardened steel and has a small diameter for minimum friction; and opening 24 provides a bearing surface for the rotation thereof. The steel shaft in a polymeric resin opening makes an inexpensive bearing which is sufficiently durable for the application. . Shaft 44 does not extend within winding 42, and this makes armature 40 more radially compact.

Beyond the lower axial end of winding 42, frame 41 is provided with a large opening 45 projecting radially inward so as to leave only a bridge 46 connecting the main portion 47 of frame 41, on which winding 42 is wound, with an axial extension 48 of frame 41. Spoke 32 extends radially into opening 45, stopping just short of bridge 46. A hardened steel shaft 50 extends axially from main portion 47 of frame 41, through axial cylindrical opening 34 of spoke 32 and into extension 48 of frame 41. Shaft 50 is fixed in both portions of frame 41 but rotatable in axial cylindrical opening 34, which serves as a bearing therefor. The extension 48 of frame 41 ends in axial fingers 49 which extend axially toward rotor 19 and interlock with the axial fingers thereof in a rotational drive arrangement.

Figure 2:
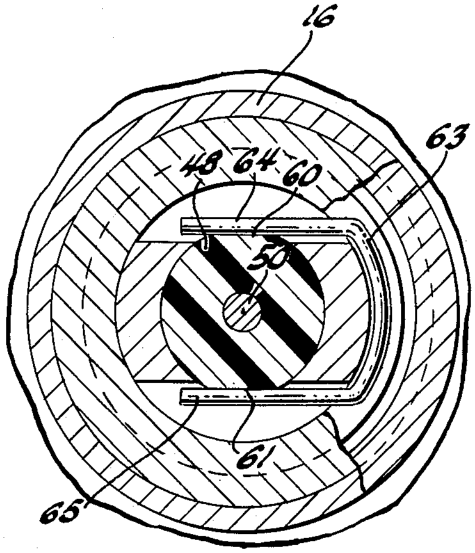
FIGS. 2 and 3 show section views along lines 2—2 of FIG. 1, with FIG. 2 corresponding to the position of FIG. 1 and FIG. 3 representing a rotated position of the armature.
Figure 3:
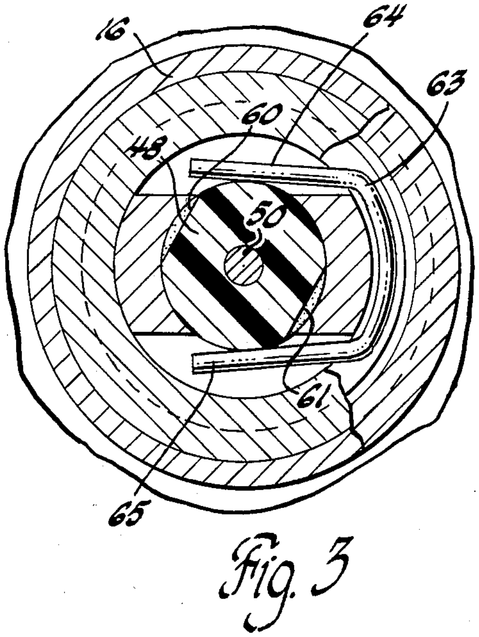
Figure 4:
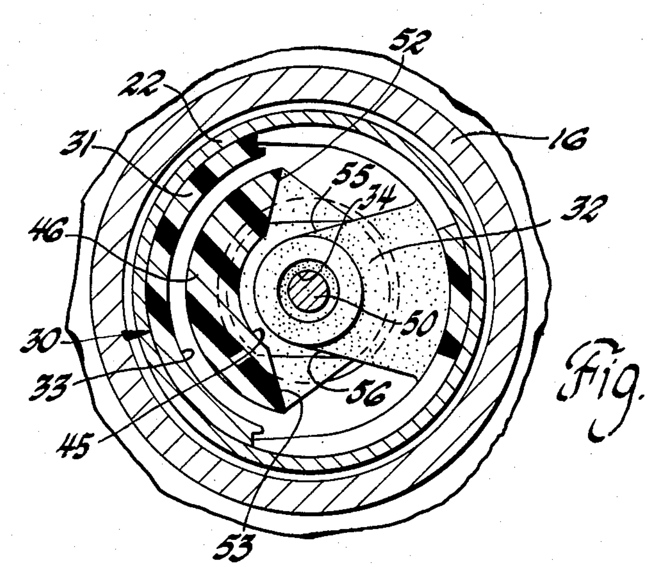
FIGS. 4 and 5 show section views along lines 4—4 of FIG. 1, with FIG. 4 corresponding to the position of FIG. 1 and FIG. 5 representing a rotated position of the armature.
Figure 5:
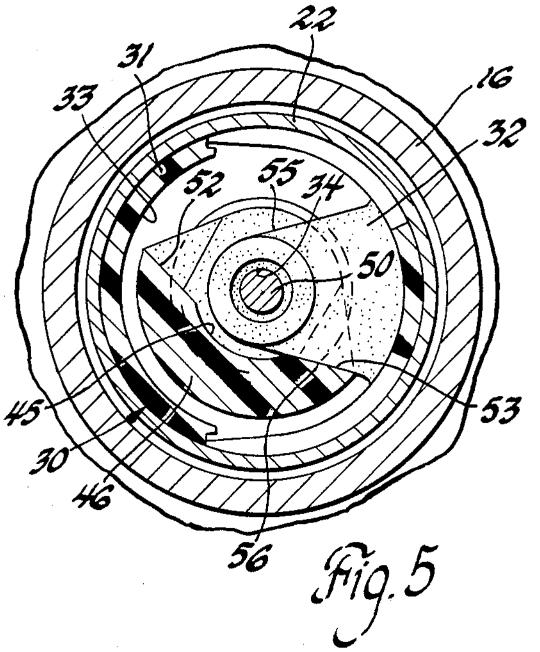
Figure 6:
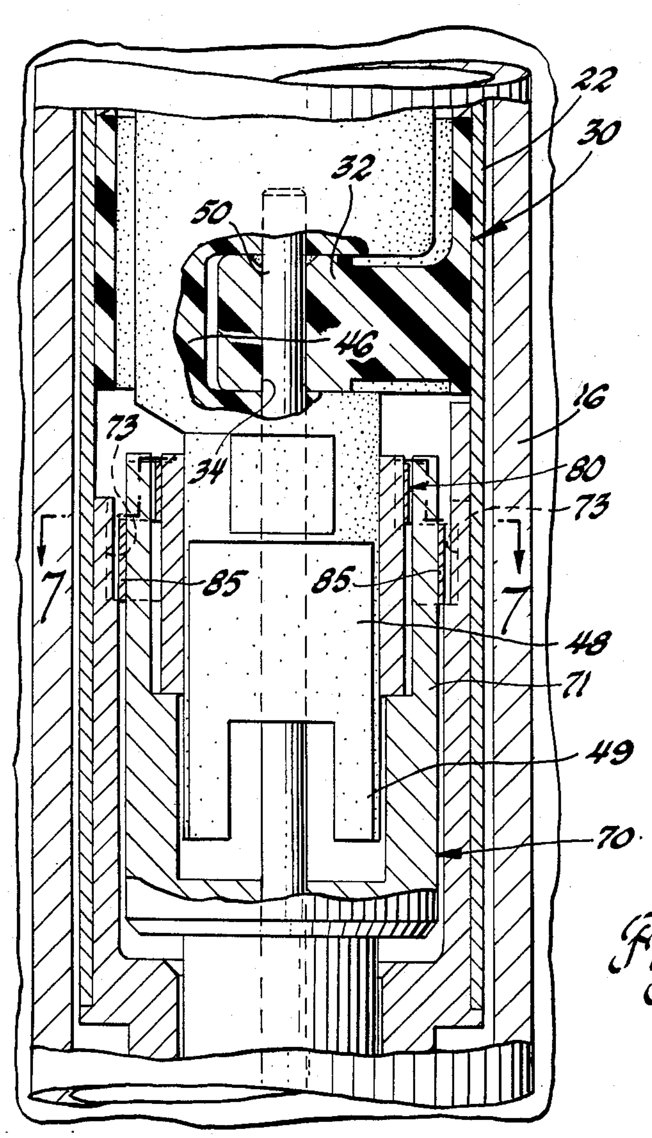
FIG. 6 shows an enlarged cutaway view of an alternate embodiment of the invention.

The embodiment of FIGS. 1–5 may be either a two or a three position device. As a two position device it may be actuated back and forth between two rotational positions defined by stops by applying actuating current in one direction or the other through armature winding 42. As a three position device a center position is added with a spring device to stop the movement from one stop and keep it in the center position until the armature is actuated again. The stop arrangement is shown in FIGS. 4 and 5. Bridge 46 is provided with stop surfaces 52 and 53, one of which encounters a shoulder 55 or 56 of spoke 32 as the armature is rotated in one direction or the other. For example, in FIG. 5 armature 40 is rotated so that stop surface 53 of bridge 46 abuts shoulder 56 of spoke 32. FIG. 4 shows a central position wherein neither stop is engaged; but the armature could clearly be rotated so that stop surface 52 of bridge 46 abuts shoulder 55 of spoke 32.

FIGS. 2 and 3 show the center stop arrangement. Extension 48 of armature frame 41 is provided with two axially extending, parallel flat surfaces 60 and 61 which engage a U-shaped spring member 63 when the armature is in a central position as shown in FIG. 2. Significant energy must be expended to bow out the arms 64 and 65 of U-shaped spring member 63 as shown in FIG. 3, wherein the armature has rotated to one of its extreme rotational positions as shown in FIG. 5. If the right amplitude and duration current pulse is provided to armature winding 42 in the right direction when armature 40 is in the position shown in FIGS. 3 and 5, armature 40 will rotate into its central position as shown in FIGS. 2 and 4 and, having lost a sufficient portion of its kinetic energy to friction, will be captured by the U-shaped spring member 63 and held in this central position until a new current pulse provides energy to send it from the central position in one direction or the other to an end stopped position.

FIGS. 6–9 show an alternate embodiment capable of more rotational positions. The basic stator and armature structure is identical to that of the previously described embodiment, including the stop arrangement shown in FIGS. 4 and 5. However, the U-shaped spring is removed to eliminate the central stopped position; and a compact ratcheting mechanism is added to provide stepped unidirectional output to drive rotor 19 of piston assembly 17. The number of steps in one complete revolution of rotor 19 depends on the angle of rotation from stop to stop of armature 40, which is determined by the width of bridge 46 relative to that of spoke 32.

Referring to FIGS. 6–9, parts identical with parts already described for the embodiment of FIGS. 1–5 are assigned the same reference numerals as in the preceding description. However, extension 48 of armature 40 does not directly engage rotor 19 of piston assembly 17 as in the preceding embodiment. Instead, the engagement is through an intermediate member 70, which has axial fingers, not shown, similar to axial fingers 49 of extension 48 and adapted to engage the similar fingers of rotor 19. Intermediate member 70 has an annular portion 71 rotatably disposed within an annular stop member 72, which is rotationally fixed within annular member 22. Stop member 72 has, on its radially inner surface, a plurality of ramps 73 all sloping in the same direction of rotation. Each ramp 73 ends, at its radially outermost end, in a radial stop surface 74, which joins the radially innermost end of the next ramp 73. Likewise, there is an annular driving member 76 around extension 48 and affixed thereto for rotation therewith. Driving member 76 has, on its radially outer surface, the same number of ramps 77 as the number of ramps 73 on stop member 72, the ramps 77, however, sloping in the opposite direction as the ramps 73. As with ramps 73, each ramp 77 is connected at its radially outermost end by a radial stop surface 78 to the radially innermost end of the next ramp 77.

Intermediate member 70 is fitted with one or more engaging spring members 80 made of sheet steel. As seen most clearly in FIGS. 7–9, each spring member 80 has an arcuate base 81 disposed on the inner circumference of intermediate member 70 and having, at one end, a finger 82 projecting into an opening 83 of intermediate member 70 for engagement therewith and, at the other end, a radially inward biased spring finger 84 which rides on ramps 77 and engages stop surfaces 78. Each spring member 80 also has a radially outwardly biased spring finger 85 which projects through an opening 86 in intermediate member 70 and engages intermediate member 70 at that opening. Spring finger 85 also rides on ramps 73 and engages stop surfaces 74 of stop member 72.

Figure 7:
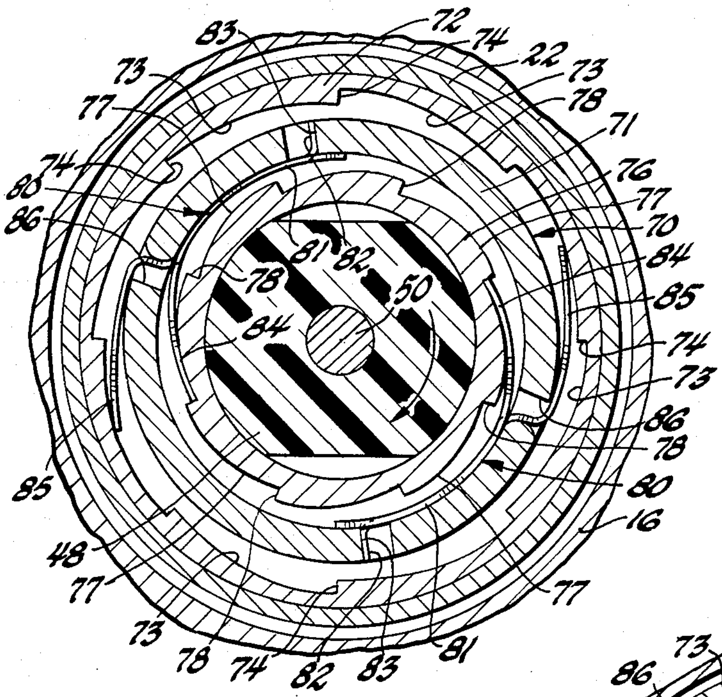
FIGS. 7 through 9 show section views along lines 7—7 of FIG. 6, with the armature in different rotational positions illustrating the operation that embodiment.
Figure 8:
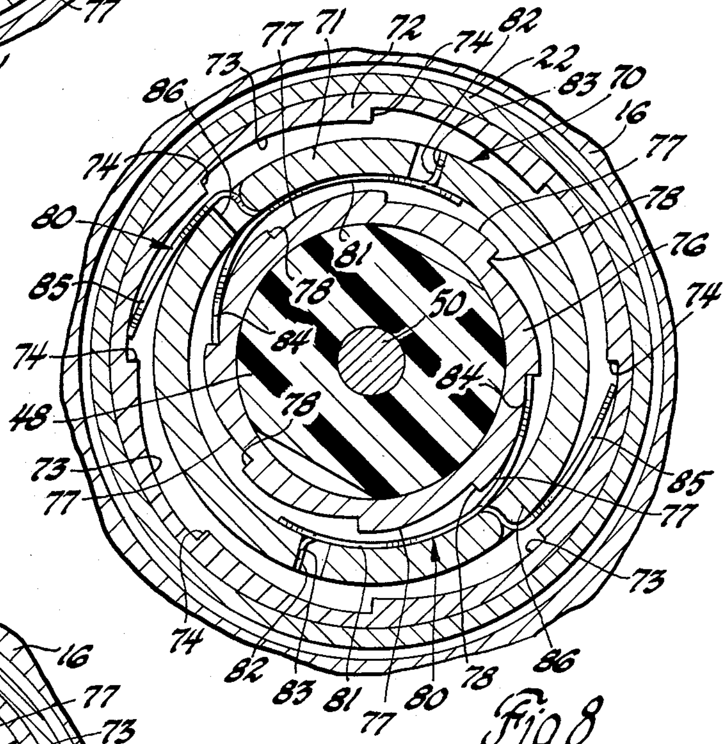
Figure 9:
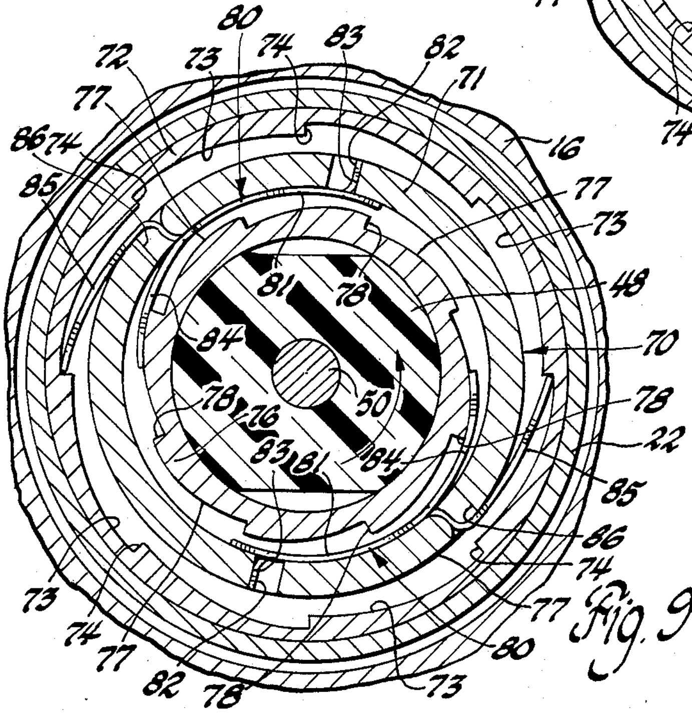

The operation of the ratchet mechanism may be seen with reference to FIGS. 7–9. In FIG. 7, extension 48 is rotating in a clockwise direction with intermediate member 70 being rotationally driven through two of the stop surfaces 78 of driving member 76, the two spring fingers 84 and fingers 82 of the two spring members 80. The spring fingers 85 are riding radially inward on ramps 73. FIG. 8 shows the relative positions of the members after complete actuation of the actuator in one direction, with the spring fingers 85 having passed the ends of the ramps 73 on which they were riding in FIG. 7 and dropped onto the next ramps. In this Figure, intermediate member 70 has been driven slightly beyond its next desired position. Finally, FIG. 9 shows extension 48 rotating counter-clockwise in response to reverse actuation of the actuator, with spring fingers 85 engaging stop surfaces 74 of stop member 72 to position intermediate member 70, and thus rotor 19 of piston assembly 17, correctly in the next position.

The embodiments of the invention in which an exclusive property or privilege is claimed are defined as follows:

1. A rotational actuator for the interior of an adjustable vehicle suspension damper device comprising, in combination:

a cylindrical permanent magnet stator;

a cylindrical armature coaxial with the stator, the armature comprising a shaftless winding on a nonmagnetic armature frame, the armature frame having a first axial end extending axially slightly beyond the winding at one axial end thereof and a second axial end extending beyond the winding at the other axial end thereof, the second axial end including output engaging means at the free end thereof and having an opening projecting radially inward across the axis of the armature;

a first shaft coaxial with the armature and having one end anchored in the first axial end of the armature frame;

first axial support means in the stator adjacent the first axial end of the armature frame and adapted to receive the other end of the first shaft for rotation therein;

second axial support means in the stator adapted to project into the opening of the second axial end of the armature frame across the armature axis;

a second shaft in the second axial end of the armature frame, the second shaft being coaxial with the armature, extending across the opening of the second axial end of the armature frame and being therein for rotation by the second axial support means, whereby the armature is supported at each axial end close to the winding while the radial size of the actuator is minimized.

2. The rotational actuator of claim 1 in which the second axial end of the armature frame comprises, at the radially inwardly projecting opening, a bridge portion radially removed from the axis thereof, the bridge portion including a pair of stops, and the second axial support means includes a pair of stops adapted to engage the stops of the bridge portion with rotation of the armature so as to limit the rotation thereof in both rotational directions.

3. The rotational actuator of claim 2 in which the second axial end of the armature frame includes a pair of flat surfaces and the stator includes a U-shaped spring member with a pair of spring arms adapted to engage the second axial end of the armature frame in the region of the flat surfaces, the spring member being so disposed as to engage the flat surfaces with minimum stored energy with the armature substantially midway between the rotational limit positions defined by the stops, the spring member in any other rotational position of the armature being subject to the spreading of its spring arms for additional stored energy, whereby a stopped rotational position of the armature is defined midway between the rotational limit positions.

4. The rotational actuator of claim 2 in which the output engaging means comprises a cylindrical member radially outward of the second axial end of the armature and the second axial end of the armature and the cylindrical member are provided with a plurality of alternating ramps and stop surfaces and an intermediate member includes spring fingers adapted to engage the ramps and stop surfaces of armature and cylindrical member to form a ratchet mechanism, whereby actuation of the armature back and forth between the rotational limit positions causes advancement of the cylindrical member in a single rotational direction through a plurality of predetermined rotational positions.

* * * * *